P. N. POTTSGROVE.
TRACTION DEVICE FOR AUTOMOBILES.
APPLICATION FILED OCT. 9, 1914.
1,142,727.
Patented June 8, 1915.
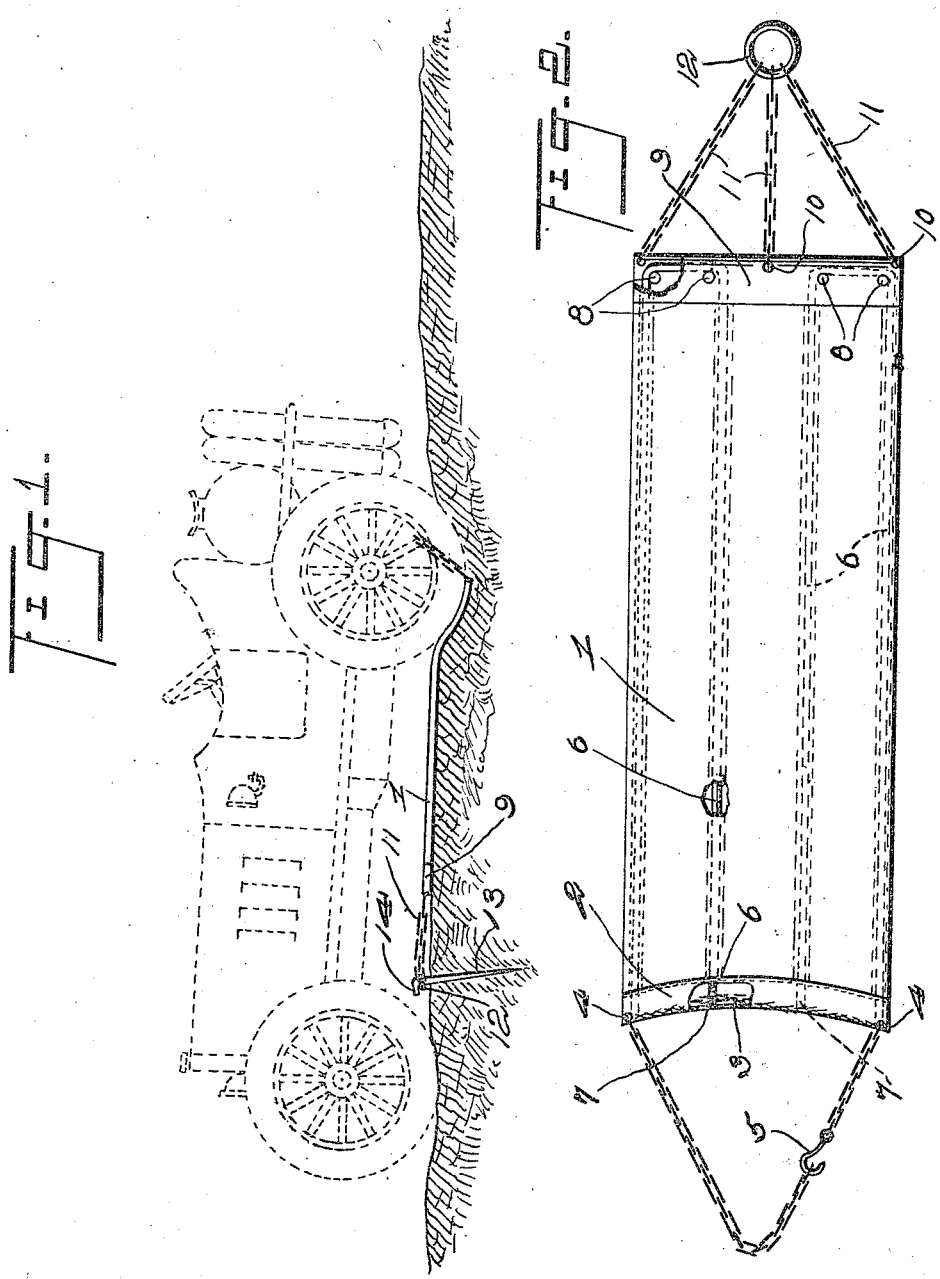
Witnesses
Inventor
P. N. Pottsgrove.

UNITED STATES PATENT OFFICE.

PHILIP N. POTTSGROVE, OF ALTOONA, PENNSYLVANIA.

TRACTION DEVICE FOR AUTOMOBILES.

1,142,727. Specification of Letters Patent. Patented June 8, 1915.

Application filed October 9, 1914. Serial No. 865,920.

*To all whom it may concern:*

Be it known that I, PHILIP N. POTTSGROVE, a citizen of the United States, residing at Altoona, in the county of Blair and State of Pennsylvania, have invented certain new and useful Improvements in Traction Devices for Automobiles; and I do hereby declare the following to be a full, clear, and exact description of the invention, such as will enable others skilled in the art to which it appertains to make and use the same.

This invention relates to new and useful improvements in traction devices for automobiles, and has for its principal object to provide a device which may be attached to the wheel of a vehicle to assist in removing the same from a rut or depression in the roadway.

Another object of the invention is to provide a device of the above character which is effectively reinforced, throughout its entire length to avoid breakage and materially assist in the tractive qualities.

Still another object of the invention is to provide a novel method of securing the device to the ground to get the necessary pressure which will easily free the end of the device and prevent any breakage.

With these and other objects in view, the invention consists in the novel combination and arrangement of parts which will be fully set forth in the following specification and accompanying drawings, in which, Figure 1 is a view of the invention as it would appear when in use, and Fig. 2 is a top plan view of the device showing portions broken away to more clearly illustrate the details of construction.

Referring now to the drawings by characters of reference, the numeral 1 designates the body portion of the device which is formed of a heavy canvas or the like. This canvas is provided at one end with the hem 2, through which a chain designated by the numeral 3, is arranged to pass. This chain is extended around the rivet 4 and one end is provided with a suitable hook 5 in such a way that the hook may be secured in one of the links in the opposite end of the chain. Suitable wire cables 6 extend longitudinally between the layers of canvas forming the body, and these wires are looped to surround the chain as at 7. The wires 6 are essentially U-shaped as indicated by the dotted lines in Fig. 1 and the bight portion of the U-shaped wires is formed by the rivet 8 which extends through the plates 9 which form the binding of the canvas opposite the hem 2. These plates 9 are provided with suitable apertures 10 through which the chains 11 are arranged to extend, and these chains are provided at their opposite ends with a suitable ring 12, the use of which will appear as the description proceeds.

Coöperating with the device hereinbefore referred to, is the pin 13 having at its upper end the angular extension 14. This pin 13 is arranged to be driven into the ground as illustrated in Fig. 1 and in such a position that the angular extension 14 will project forwardly and provide a stop for the ring 12 which is slipped thereover.

From the foregoing it will be apparent that in use the pin 13 is driven into the ground and the ring 12 is then slipped over the extension 14. The device is then laid out in the position illustrated in Fig. 1 and the chain 3 passed around the tire of the vehicle and around one of the spokes in the manner illustrated and the hook 5 secured in one of the links so that when power is applied to the wheel and the same starts to revolve, pull will be exerted on the body of the device and the same will wind on the wheel, thus drawing car toward the stake 13. Should the car pass the stake it will be apparent that no damage will result for the reason that the ring 12 may be easily passed over the head 14 and thus any danger of breakage of the chains or reinforcing cables 6 is eliminated.

It is to be understood that when so desired suitable chains may be substituted in place of the reinforcing cables 6 and if required, the hem 2 may be reinforced by securing a piece of leather thereto and in this way prevent wear and materially increasing the life of the device.

While in the foregoing there has been shown and described the preferred embodiment of this invention, it is to be understood that such changes may be made in the combination and arrangement of parts as will fall within the spirit and scope of the invention as defined in the appended claims.

What is claimed is:

1. A device of the character described comprising a webbing, a hem formed in one end of the web, a chain extending through the hem, said chain being arranged to be attached to a wheel of an automobile, reinforcing members extending throughout the entire length of the web, metal binding strips on the end of the web opposite the hem, and chains secured to the metal binding strips and arranged to be secured to a stationary object, whereby when the wheel is revolved the device will be wound upon the tire and thereby cause the vehicle to be moved.

2. A device for removing vehicles from ruts including a web, means to secure one end of the web to a vehicle wheel, reinforcing elements extending throughout the entire length of the web, binding strips at the end of the web opposite the securing means, said binding strips being riveted in place and the reinforcing elements passing around the rivets, and means connected to the binding strips to secure the web and hold the same stationary so that when power is applied to the wheel the web will be wound thereupon and thus remove the vehicle from a rut.

In testimony whereof I affix my signature in presence of two witnesses.

PHILIP N. POTTSGROVE.

Witnesses:
　MARY DUNN,
　ANNA POTTSGROVE.